March 17, 1931.　　　　J. L. WOODBRIDGE　　　　1,796,818

ELECTRIC STORAGE BATTERY

Filed June 20, 1927

INVENTOR

Joseph Lester Woodbridge

BY

Augustus B. Stoughton

ATTORNEY.

WITNESS:

Robt. R. Kitchel.

Patented Mar. 17, 1931

1,796,818

UNITED STATES PATENT OFFICE

JOSEPH LESTER WOODBRIDGE, OF PHILADELPHIA, PENNSYLVANIA

ELECTRIC STORAGE BATTERY

Application filed June 20, 1927. Serial No. 199,941.

This application is a continuation in part of my application Serial No. 146,109, filed November 4, 1926, and allowed February 10, 1927.

My invention relates to storage battery cells in which the elements are assembled in a suitable container provided with a closure, through which closure the terminals project in order to provide electrical connection to an external circuit, and it has for its object the provision of a more effective and permanent seal between the terminal post and the cover for preventing the escape of the electrolyte in the cell. This and other objects of the invention will be apparent from the following description taken in connection with the accompanying drawing, in which Figure 1 is a view partly in section of a terminal post seal involving features of the invention and showing the same assembled but not in final position.

Figure 1:
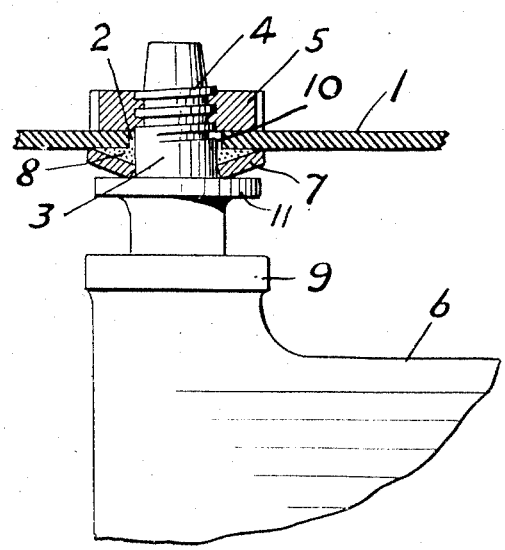

In the drawing 1 designates a portion of the cover of a storage battery cell, having a circular opening at 2, through which projects the terminal post 3, there being provided or occurring an annular crevice, space, or clearance between the rim of the hole and the surface of the post. The post 3 is provided with screw threads 4 adapted for engagement with the seal nut 5. At the base of the terminal post 3 is a shoulder 11 beneath which the post extends to the strap or connecting bar 9 to which the storage battery plates 6 are attached. Other details of the cell have been omitted, as they are not necessary for a full understanding of the invention.

Figure 2:
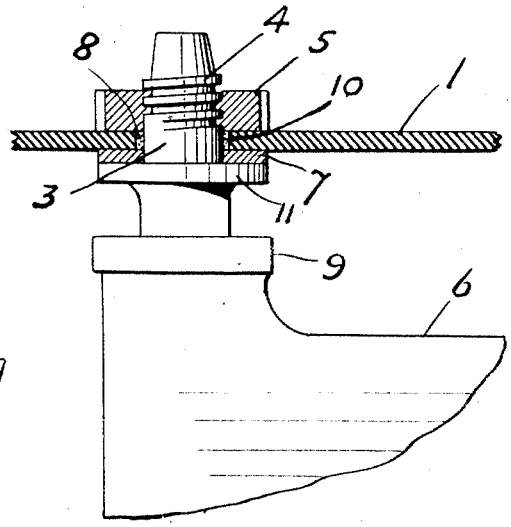
Figure 2 is a similar view showing the parts in final position.

Referring to Figures 1 and 2 a washer 7 of lead or lead alloy is shown surrounding the post 3 just above the shoulder 11 which washer as shown in those figures of the drawing and as first applied is conical or dished in shape with the concave surface upward, thus providing a cavity between the upper concave surface of this washer and the cylindrical surface of the post 3 and the under surface of the cover 1. This cavity is filled with a semi-fluid material 8 such as grease or other similar material which is inert, non-conducting and impervious to the electrolyte in the cell. This mass of grease may be applied to the washer after it is in place, resting on the shoulder 11 and before the cover 1 is applied by pouring the molten grease into the space provided for it, and then allowing it to cool and stiffen; or it may be applied by dipping the washer 7 into the grease or similar material in a semi-fluid state before the washer is placed in position, or in any other convenient manner.

After the parts have been assembled as shown in Figure 1 of the drawing, the seal nut 5 is screwed down, forcing the washer 7 to flatten down on the shoulder 11. This process will at first force the cover with considerable pressure against the upper edge of the washer 7, thus preventing the escape of the grease from this point. The lower and inner edge of the washer 7 will at the same time be forced against the shoulder 11, preventing the escape of the grease at this point. The result will be that the grease will be forced upward into the space 10 between the cover and the post, filling this space to such an extent as to form an effective seal between the post and the cover to prevent the escape of the electrolyte from the cell.

Figure 3:
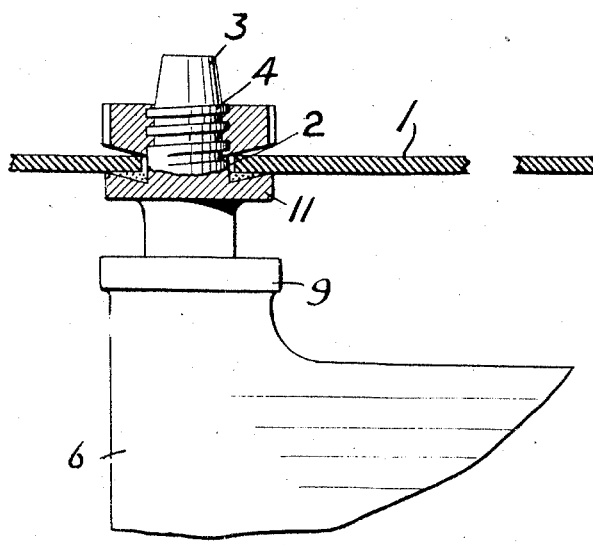
Figures 3 and 4 are similar views showing modifications not in final positions.
Figure 4:
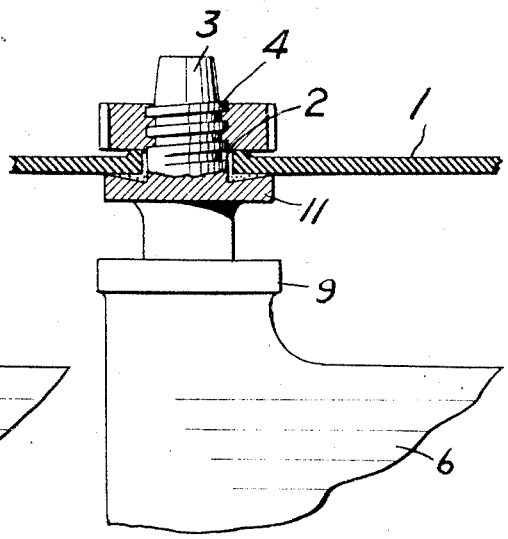

The construction and operation of the modifications shown in Figures 3 and 4 are as above described except that the shoulder 11 is provided on its top with a cup shaped depression or cavity which is filled with grease and the cover itself which is slightly flexible is deformed and pressed down into this cavity when the seal nut is screwed down thus forcing the grease up into the annular space between the post and cover. In Figure 3 the under surface of the seal nut is conical to produce this deformation of the cover, and in Figure 4, a slight rim is raised on the cover around the opening against which the seal nut bears, thus forcing the cover down into the recess of the collar on the post.

It has heretofore been the custom to use a washer or gasket of soft rubber between the shoulder 11 and the cover 1 but this device has not proven entirely satisfactory owing to the fact that the rubber will eventually harden and assume a permanent form, losing its resiliency and thus permitting spaces to develop between the washer and the cover and the post through which electrolyte may escape. The invention described above obviates these disadvantages and provides an inexpensive and effective means and method for permanently sealing the joint between the terminal post and the cover.

I claim:

1. The method of sealing the space between the surface of a shouldered storage battery terminal post and the rim of the hole in the cell closure through which the post passes, which consists in arranging a supply of semi-fluid sealing compound in a cavity arranged in proximity and in communication with said space, and injecting the compound from the cavity into said space by deformation of one of the walls of the cavity.

2. Means for sealing the space between the surface of a shouldered storage battery terminal post and the rim of a hole in a storage battery closure through which the post passes, which means comprise a dished receptacle arranged under the cover in confronting relation to said space and adapted to contain a supply of semi-fluid sealing compound and deformable provisions adapted upon deformation to inject the compound into the space.

3. The method of sealing the space between the surface of a cupped shouldered storage battery terminal post and the rim of the hole in the cell closure through which the post passes, which consists in arranging a supply of semi-fluid sealing compound in the cavity between the cupped shoulder and the under surface of the closure and injecting the compound from the cavity into said space by deforming the closure into said cavity.

4. In combination a battery terminal post having a cupped shoulder, a deformable closure perforated to receive the terminal post above the shoulder, a semi-fluid sealing material in the cupped cavity of the shoulder, and means for deforming and forcing the closure into said cavity whereby the compound is forced into the space between the post and the rim of the hole in the closure.

5. The method of sealing the space between the surface of a cupped shouldered storage battery terminal post and the rim of the hole in the cell closure through which the post passes, which consists in arranging a supply of semi-fluid sealing compound in the cavity between the cupped shoulder and the under surface of the closure, placing the lip of the shoulder on the terminal post against the under surface of the closure and injecting the compound from the cavity into said space by deforming the closure into said cavity.

6. In combination a battery terminal post having a cupped shoulder, a deformable closure perforated to receive the terminal post above the shoulder, a semi-fluid sealing material in the cupped cavity of the shoulder, and means for placing the lip of the cupped shoulder against the lower surface of the closure and deforming and forcing the closure into said cavity whereby the compound is forced into the space between the post and the rim of the hole in the closure.

JOSEPH LESTER WOODBRIDGE.